(12) United States Patent
Mazur et al.

(10) Patent No.: US 7,007,458 B2
(45) Date of Patent: Mar. 7, 2006

(54) VEHICLE HAVING AN EMISSION CONTROL DEVICE DIAGNOSTIC COMPUTER

(75) Inventors: Christopher John Mazur, Canton, MI (US); Michael Leonard Corsetti, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 10/375,798

(22) Filed: Feb. 27, 2003

(65) Prior Publication Data

US 2004/0168430 A1    Sep. 2, 2004

(51) Int. Cl.
   *F01N 3/00*    (2006.01)
(52) U.S. Cl. .............................. 60/277; 60/274; 60/276
(58) Field of Classification Search ................. 60/274, 60/276, 277; 73/23.31, 23.32, 118.1; 701/103, 701/109
   See application file for complete search history.

(56) References Cited

U.S. PATENT DOCUMENTS

| | | | |
|---|---|---|---|
| 5,351,484 A | 10/1994 | Wade | |
| 5,509,267 A * | 4/1996 | Theis | 60/274 |
| 5,625,750 A | 4/1997 | Puskorius et al. | |
| 5,626,014 A | 5/1997 | Hepburn et al. | |
| 5,627,757 A | 5/1997 | Comignaghi et al. | |
| 5,706,652 A | 1/1998 | Sultan | |
| 5,758,491 A * | 6/1998 | Agustin et al. | 60/274 |
| 5,896,743 A | 4/1999 | Griffin | |
| 5,899,062 A | 5/1999 | Jerger et al. | |
| 5,974,786 A | 11/1999 | Kluzner et al. | |
| 6,006,153 A | 12/1999 | Stander et al. | |
| 6,282,888 B1 | 9/2001 | Sealy et al. | |
| 6,425,242 B1 | 7/2002 | Booth et al. | |
| 6,463,735 B1 * | 10/2002 | Morinaga et al. | 60/277 |
| 6,761,024 B1 * | 7/2004 | Uchida | 60/277 |
| 6,850,165 B1 * | 2/2005 | Sakanushi et al. | 60/277 |

OTHER PUBLICATIONS

"A Study on a Catalytic Converter OBD before Light-Off", Seung Won Yun et al., International Journal of Automotive Technology, vol. ?, No. ?, pp. ? (year) .

* cited by examiner

*Primary Examiner*—Thomas Denion
*Assistant Examiner*—Diem Tran
(74) *Attorney, Agent, or Firm*—Allan J. Lippa; Alleman Hall McCoy Russell & Tuttle LLP

(57) ABSTRACT

A computer controlled diagnostic system is described that monitors catalyst activity of an upstream catalyst using a sensor located downstream of a downstream catalyst. In this way, a system configuration is achieved that allows for diagnosis as well as improved air-fuel ratio control.

17 Claims, 3 Drawing Sheets

VEHICLE HAVING AN EMISSION CONTROL DEVICE DIAGNOSTIC COMPUTER

BACKGROUND AND SUMMARY OF THE INVENTION

Vehicles with internal combustion engines typically utilize emission control devices, such as catalytic converters, to reduce exhaust emissions. In one example vehicle system, multiple catalytic converters are utilized, with one in an upstream location and one in a downstream location. Further, the performance of these emission control devices is monitored using exhaust gas sensors. If degradation of the emission control device is detected, then an indicator light it typically illuminated.

The inventors of the subject application have recognized an apparently irreconcilable paradox in designing an emission control system that meets the ever-increasing emission control requirements. In particular, the inventors have found that for improved air-fuel control using multiple exhaust gas sensors, it is good to have larger amounts of catalyst volume between the sensors, and a smaller amount of catalyst volume downstream of the last exhaust gas sensor. This allows for improved air-fuel control and reduced emissions, even as the catalysts and exhaust gas sensors age over time.

On the other hand, the inventors herein have recognized that for improved diagnosis, it is good to have a small catalyst volume between exhaust gas sensors. This is due in part to the strict emission regulations. Specifically, if the upstream catalyst is degraded, the emission requirements may not be met even if the downstream catalyst is functioning at peak efficiency. In other words, diagnostics that monitor the upstream catalyst performance independent of the downstream catalyst performance can result in improved diagnostics.

As such, some systems can require three exhaust gas sensors to meet these competing objectives. However, the inventors herein have recognized that this can add significant cost to the vehicle, since only two sensors were used in previous vehicles.

The disadvantages of prior art approaches are a overcome by a computer-controlled emission diagnostic system for an engine exhaust system of a vehicle, comprising a first emission control device coupled to an exhaust of the engine; a second emission control device coupled downstream of said first emission control device; a first exhaust gas sensor coupled upstream of said first emission control device; a second exhaust gas sensor coupled in or downstream of said second emission control device; a computer storage medium having a computer program encoded therein for monitoring the engine exhaust system comprising: code for reading a first signal from said first exhaust gas sensor, code for reading a second signal from said second exhaust gas sensor; code for indicating an interval in which said first emission control device is operating above a preselected performance and said second emission control device is operating below a predetermined performance based on operating conditions; and code for determining performance of said first emission control device based at least on said first and second signals during said indicated interval.

In one example, the interval occurs directly after an engine cold start, where the first emission control device warms and becomes active before the second emission control devices can warm and become active.

By determining performance during the interval when the upstream device is operating with a specified performance while the downstream device is not, it is possible to perform accurate diagnosis even with two sensors having sufficient volume between them so that accurate air-fuel control can be achieved. In other words, during the specified conditions, the upstream device should be performing substantially more emission conversion than the downstream device. As such, even though two sensors are used with both devices between them, it is possible to determine the performance of the upstream device. At the same time, the sensors are in an effective position to provide accurate air fuel ratio control. As such, it is possible to provide a system without requiring additional sensors.

Note that, if desired, additional exhaust gas oxygen sensors can be used to further supplement the system. Also, it is possible to have additional emission control devices, which can be added in an upstream and/or downstream location. Note also that there are various ways to determine the interval, such as time duration, er based on estimates of catalyst temperature or storage capacity.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DETAILED DESCRIPTION OF EMBODIMENTS OF THE INVENTION

Figure 1:
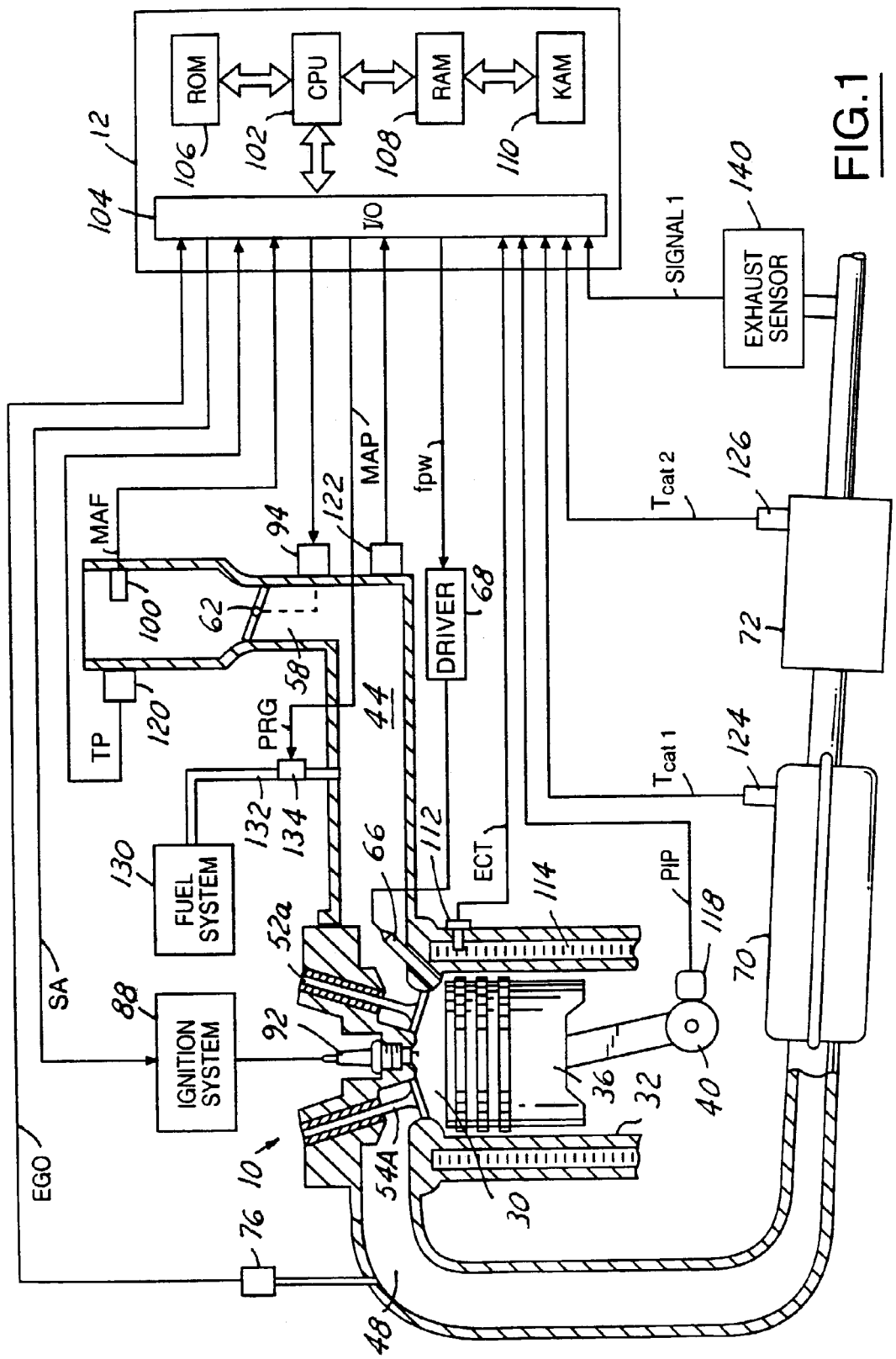
FIGS. 1–2 are block diagrams of an engine and exhaust system.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of emission control device 70. In this particular example, sensor 76 provides signal EGO, which indicates whether exhaust air-fuel ratio is either lean of stoichiometry or rich of stoichiometry. Signal EGO is used to control engine air-fuel ratio as described in more detail below. In an alternative embodiment, sensor 76 provides signal UEGO to controller 12, which converts signal UEGO into a relative air-fuel ratio k. Signal UEGO is used to advantage during feedback air-fuel ratio control in a manner to maintain average air-fuel ratio at a desired air-fuel ratio.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel ratio layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air-fuel ratio mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of steichiometry, or a value lean of stoichiometry. Operation substantially at (or near) stoichiometry refers to conventional closed loop oscillatory control about stoichiemetry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Figure 2:
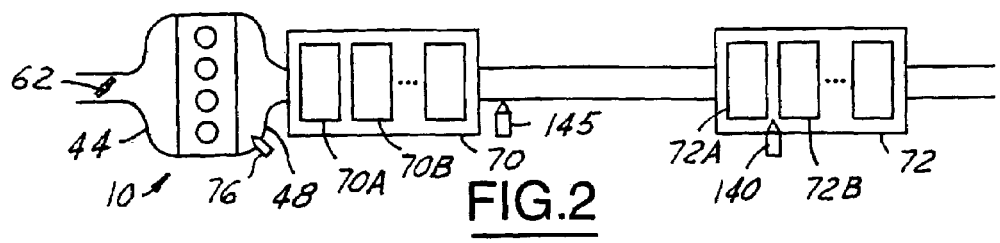

Second emission control device 72 is shown positioned downstream of device 70. Devices 70 and 72 can be various types of emission control devices. As shown in FIG. 2, each device can contain multiple catalyst bricks (70A, 70B, and so on; 72A, 72B, and so on). Alternatively, each can contain a single catalyst brick. Additionally, various types of catalytic converters can be used, such a three-way catalytic washcoats. For example, three way catalyst that absorb NOx when engine 10 is operating lean of stoichiometry can be used. In such catalysts, the absorbed NOx is subsequently reacted with rich exhaust gas constituents (HC and CO, for example) and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperatures Tcat1 and Tcat2 of devices 70 and 72 are inferred from engine operation. In an alternate embodiment, temperature Tcat1 is provided by temperature sensor 124 and temperature Tcat2 is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

In one example, exhaust sensor 140 is a second EGO type exhaust gas oxygen sensor that produces output signal (SIGNAL1). In an alternative example, sensor 140 can be a UEGO sensor.

While FIG. 1 shows a direct injection engine, a port fuel injection engine, where fuel is injected through a fuel injector in intake manifold 44, can also be used. Engine 10 can be operated homogeneously substantially at stoichiometry, rich of stoichiometry, or lean of stoichiometry.

Those skilled in the art will recognize, in view of this disclosure, that the methods described below can be used to advantage with either port fuel injected or directly injected engines.

Referring new to FIG. 2, an alternative view of engine 10 and the engine exhaust system is shown. In this example, engine 10 is shown to be an in-line four-cylinder engine. Note that various types of engines can be used with the methods described below such as, for example: a V-type 6-cylinder engine, a V-type 8-cylinder engine, an in-line 4-, 5-, or 6-cylinder engine, or various other engine types. FIG. 2 shows emission control devices 70 and 72 having multiple catalyst bricks. Note that this is just one example showing two or more catalyst bricks in each of the emission control devices. However, emission control device 70 can have two bricks or only a single brick, while emission control device 72 can also have only two bricks, or only a single brick. In this particular example, emission control device 70 has catalyst bricks 70A, 70B, etc. Furthermore, emission control device 72 also has catalyst bricks 72A, 72B, etc.

Also note that in the example of FIG. 2, the upstream EGO sensor is shown coupled in the exhaust manifold 48, while the downstream EGO sensor 140 is shown coupled between bricks 72A and 72B of emission control device 72.

Note that sensors 76 and 140 can be placed in alternate locations in the exhaust system of engine 10. For example, sensor 140 can be placed downstream of emission control device 72 as shown in FIG. 1. Alternatively, sensor 76 can be placed between bricks 70A and 70B. Still another example can be used where sensor 140 is placed directly upstream of the last catalyst brick of emission control device 72.

FIG. 2 also shows a third EGO sensor 145 shown coupled between devices 70 and 72. In one example embodiment, sensor 145 is rendered unnecessary for emission control device diagnostics of devices 70 and 72. However, if desired for improved performance, or other control objectives, a third sensor 145 can be used.

Note that in one example embodiment of emission control device 70 is placed in a close coupled location to exhaust manifold 48 as shown in FIG. 2. In an alternative embodiment, the device 70 can be placed further away from exhaust manifold 48. Similarly, in one example, device 72 is placed in an underbody location (i.e., below the vehicle body/chassis, for example). However, in an alternate embodiment, device 72 can be placed upstream and coupled near device 70. Also note that, for improved performance, additional emission control devices can be placed in the exhaust system of engine 10.

As described above, one embodiment of the present invention uses an exhaust gas oxygen (EGO) sensor upstream of the catalyst system for closed loop feedback fuel control. A second EGO sensor that can be positioned downstream of the closely coupled emission control device is also used. The downstream EGO sensor serves at least two purposes. First, this EGO sensor is used as part of the dual air-fuel ratio feedback control strategy. This strategy serves as a fuel control algorithm that maintains a post-emission control device air-fuel ratio at a desired level, thereby offsetting aging effects experienced by the upstream EGO sensor, which is directly coupled in the exhaust manifold and therefore has no upstream catalyst volume to protect it.

The second function of the downstream EGO sensor is its role in the catalyst monitoring strategy/diagnostic strategy. The downstream EGO sensor is used to monitor the catalysts by, in one example, monitoring oxygen storage capacity of the catalyst. Under closed-loop fuel conditions, well operating emission control devices have a threshold level of oxygen storage. This oxygen storage causes the switching frequency of the rear EGO sensor to be slower than the upstream EGO sensor. Further, this oxygen storage reduces the amplitude of the downstream EGO sensor switching as compared to the amplitude of the front EGO sensor. As emission control device performance (in one example efficiency) degrades due to for example, thermal and/or chemical degradation, the ability to store oxygen declines. Either a switch ratio or index ratio of the front and rear EGO sensors can be used as a measure of catalyst performance. A switch ratio is the ratio of EGO switches, (transitions between lean or rich or rich to lean) of the upstream EGO sensor to the switches of the downstream EGO sensor.

In prior art approaches, catalyst diagnosis is performed well after the emission system has reached a predetermined operating temperature and the vehicle is operating during steady state portions of the drive cycle.

As previously described, the requirements of the catalyst volumes, and the location of the EGO sensors for dual air-fuel control and catalyst monitoring can conflict in exhaust systems designed to meet low emission levels.

Monitoring

Past wisdom has taught that the catalyst monitoring strategy should monitor the upstream emission control device. In other words, past wisdom has taught that to obtain improved monitoring, the downstream EGO sensor should be positioned with as little catalyst volume between the downstream EGO sensor and the upstream emission control device as possible. This is because the upstream emission control device (in one example a light off or close coupled emission control device) performs a majority of the chemical conversion of engine emissions. Further, the emission control device monitor should be able to identify when the light-off catalyst degrades. Still further, the catalyst nearest the engine degrades first, allowing the emission control device monitor to be more sensitive and illuminate an indicator at lower emission standards. Conventional thought was that an EGO sensor positioned between two underbody emission control device bricks could not be used for low emissions monitoring since the activity of the underbody brick would influence the downstream EGO sensor, ~hereby providing inaccurate information about the status of the light-off catalyst.

Dual Air/Fuel Ratio Control

A downstream EGO sensor that is used for air-fuel ratio control should have enough catalyst volume upstream to protect it from the effects of system aging. As the upstream EGO is aged, its signal can use additional correction. In order for the downstream sensor to be effective, it should be protected from the exhaust constituents by sufficient upstream catalyst volume to allow the downstream EGO sensor to participate in the adaptive learning involved with the dual air-fuel ratio control. However, the exhaust system configurations capable of achieving low level emissions may not have enough light-off catalyst volume to protect the downstream EGO sensor if the sensor is positioned between the upstream emission control device and the downstream emission control device. An EGO sensor that is used for dual air-fuel ratio control also normally needs some catalyst volume behind it to act as a buffer for any emission spikes. However, a position of the downstream EGO sensor behind the entire catalyst volume may also be possible.

One embodiment of the present invention involves a new method of performing catalyst monitoring that allows for the downstream EGO sensor to be located Jn er behind the downstream or underbody emission control device. Using such methods in such a location allows each EGO sensor to adequately perform both air-fuel ratio and monitoring. Therefore, this embodiment of the invention eliminates the need for an extra EGO sensor between devices 70 and 72 while maintaining emission requirements.

As will be described below, rather than performing catalyst monitoring after the catalyst system has reached a pre-selected operating temperature, this example embodiment of the present invention performs monitoring after the upstream emission control device becomes activated, but before the underbody, or second emission or downstream emission control device becomes active. This strategy allows an EGO sensor located between or behind the underbody bricks to detect only light-off brick activity during or shortly after the engine is started. This strategy is also non-intrusive to air-fuel ratio control strategy.

One example approach to determine when an emission control device becomes active is to determine when it has reached a temperature high enough that the catalysts' oxygen storage sites are active. In other words, the catalyst performance is determined to be at a preselected level based on measured or estimated catalyst temperature. In an alternative embodiment, a determination can be made when the catalyst has a predetermined percentage of oxygen storage capacity activated, or simply when catalyst temperature reaches a pre-selected value. Either measured, or estimated/inferred temperatures can be used. Still another example would be to determine a predetermined time period after an engine start. Yet another example would be to determine whether a predetermined amount of catalyst activity or reaction has occurred. Still other examples are possible.

The figure below illustrates a second example embodiment of a catalyst monitor control strategy capable of monitoring the upstream emission control device when a single downstream EGO sensor located in or downstream of the downstream emission control device is used. The variables listed (X, Y, TMAX) are predetermined maximum and minimum values that are stored in the powertrain control module 12 and determined through engine testing and calibration. The strategy shown uses a switch ratio catalyst monitoring system. However, it is possible to use an index ratio catalyst monitoring system with adjustments to account for the multiplicity of air mass cells.

Figure 3:
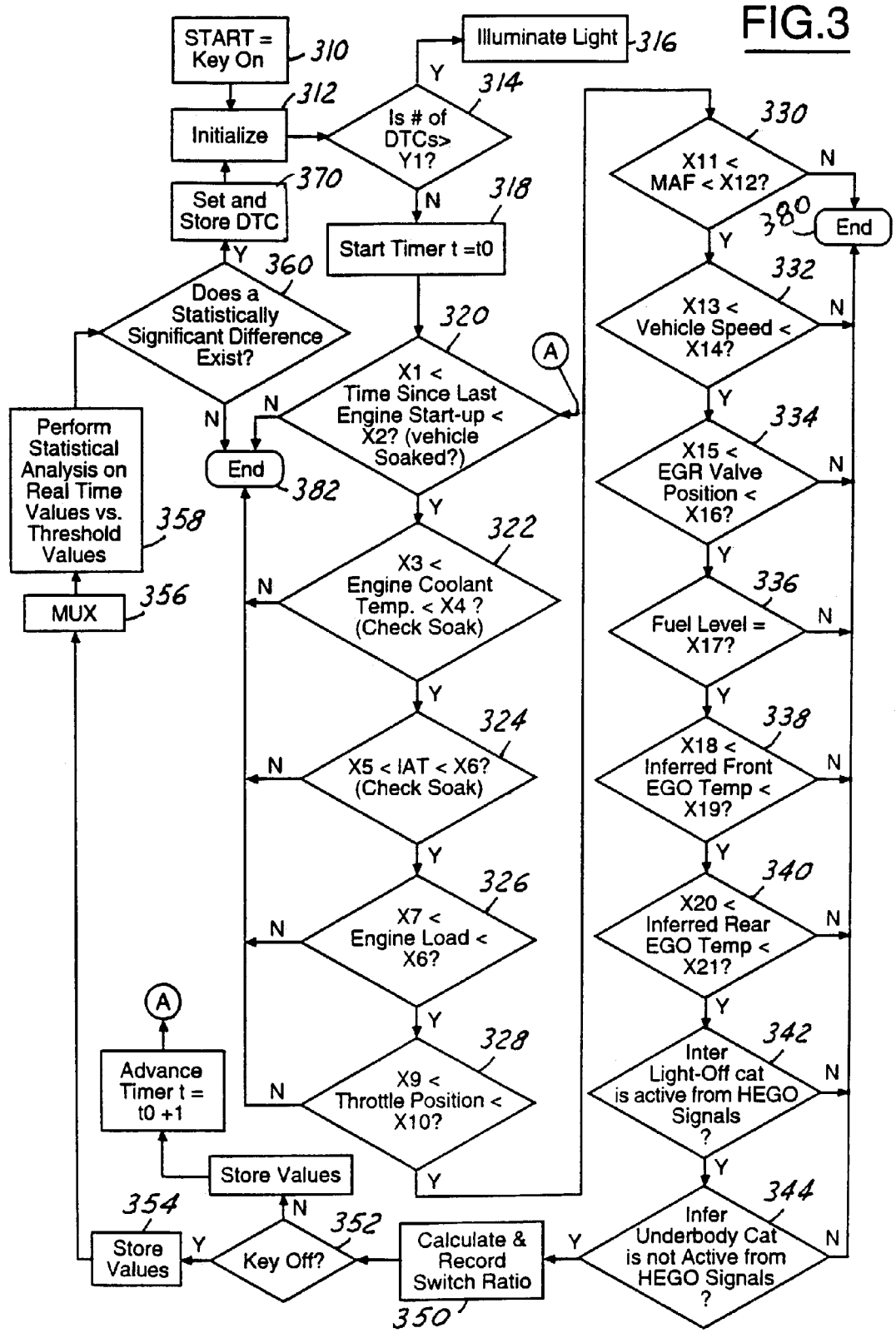
FIG. 3 is a high level flow chart of various operations performed by a portion of the embodiment shown in FIGS. 1–2.

A second example of the catalyst monitoring strategy of the present invention is now described with regard to FIG. 3. First, in step 310, the routine starts when the vehicle key is turned by the vehicle operator to the key ~on" position. Then, in step 312, the routine initializes the diagnostic parameters that have been previously set and stored as will be described below. Then, the routine continues to step 314 where a determination is made as to whether a number of diagnostic test codes (DTC) is greater than a threshold value Y1. When the answer to step 314 is "yes", the routine continues to set step 316 and illuminates an indication light. When the answer to step 314 is "no", the routine continues to step 318 and starts timer T at value T zero.

From step 318, the routine continues to step 320 where a determination is made as to whether the time since the last engine start-up is between values X1 and X2. In other words, the routine determines whether the vehicle has set with the engine not operating for a predetermined amount of time (soak time). When the answer to step 320 is "yes", the routine continues to step 322. In step 322, a determination is made as to whether the engine coolant temperature is between thresholds X3 and X4. When the answer to step 322 is "yes", the routine continues to step 324 where the intake air temperature (TAT) ]s checked to see if it is between thresholds X5 and X6. Both the determinations in step 322 and 324 further determine whether the vehicle has had a proper engine soak.

When the answer to step 324 is "yes", the routine continues to step 326. In step 326, the routine determines whether the engine load is between engine load threshold values X7 and X8. When the answer to step 326 is "yes", the routine continues to step 328. In step 328, the routine determines whether the throttle position of throttle plate 62 is between thresholds X9 and X10. When the answer to step 328 is "yes", the routine continues to step 330. In step 330, the routine determines whether the mass air flow sensor reading (MAF) is between thresholds X11 and X12. Again, after the answer to step 330 is "yes", the routine continues to step 332 to determine whether the vehicle speed is between thresholds X13 and X14. When the answer to step 332 is "yes", the routine continues to step 334. In step 334, the routine determines whether the exhaust gas recirculation valve position is between thresholds X15 and X16. When the answer to step 334 is "yes", the routine continues to step 336. In step 336, the routine determines whether the fuel level is greater than threshold X17.

When the answer to step 336 is "yes", the routine continues to step 338. In step 338, the routine determines whether the inferred exhaust gas oxygen temperature of the upstream exhaust gas sensor 76 is between threshold temperatures X18 and X19. In an alternative embodiment, temperature of upstream exhaust gas oxygen sensor can be measured from a sensor rather than inferred from engine operating conditions such as engine speed, engine load, exhaust gas temperature, and various others. When the answer to step 338 is "yes", the routine continues to step 340 to determine whether the inferred exhaust gas oxygen sensor temperature of the downstream sensor 140 is between thresholds X20 and X21. Again, the downstream EGO sensor can be either inferred or measured. When the answer to step 340 is "yes", the routine continues to step 342 to determine whether the upstream emission control device 70 is active. In one example, the routine determines whether upstream catalyst 70 is active from the signals of EGO sensors 76 and 140.

In an alternative embodiment, a predetermined time since engine start can be used. In still another alternative embodiment, a determination can be made that the upstream emission control device is active based on an estimate of the upstream emission control device temperature or oxygen storage, as described above. When the answer to step 342 is "yes", the routine continues to step 344 where a determination is made as to whether the downstream emission control device is not active based on the EGO signals. Similarly as in step 342, various alternative methods can be used to determine whether the downstream emission control device 72 is active such as, for example, estimated temperature, oxygen storage capacity, percentage of oxygen storage capacity, or various others.

The various engine operating conditions checked in steps 322 to step 340 represent example operating conditions that can be used to determine whether to enable catalyst monitoring. While these engine operating conditions have been described, still other parameters could also be used. Likewise, it is possible to use a subset, or even none of these engine operating conditions to determine whether to enable catalyst monitoring.

When the answer to any of steps 320 through 344 is "no", the routine continues to step 380 and ends.

When the answer to step 344 is "yes", the routine continues to step 350. In step 350, the routine calculates and records the switch ratio between EGO sensors 140 and 486. Then, in step 352, a determination is made as to whether the vehicle key is "off".

When the answer to step 352 is "yes", the routine continues to step 354 to store the calculated and recorded switch ratios. Then, in step 356, the new stored values and previous stored values are combined and in step 358 the routine performs statistical analysis on the real time data values versus threshold values. Then, in step 360, the routine determines whether a statistically significant difference exists. If the answer to step 360 is "no", the routine ends in step 382. When the answer to step 360 is "yes", the routine continues to step 370 to set and store a diagnostic test code. From step 370, the routine returns to the initialization in step 312.

Figure 4:
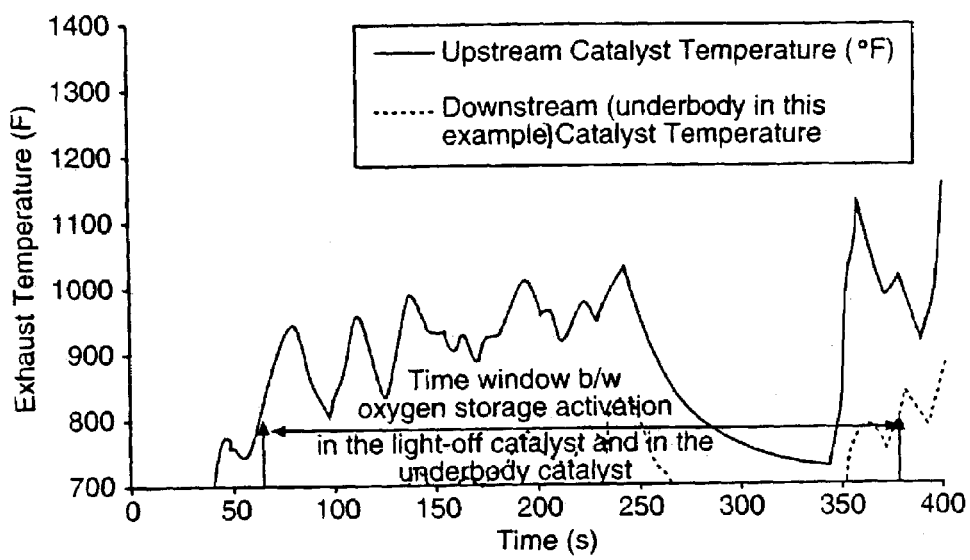
FIGS. 4–5 show experimental test data of emission control device temperatures versus time.

To illustrate the potential advantage of various aspects of the present invention, an experiment was performed on a vehicle to estimate {in one example implementation) a time window that is available between the activation of the upstream emission control device and the downstream emission control device. As FIG. 4 below illustrates, after the light-off catalyst has reached its activation temperature of approximately 800° F., a time window exists prior to the activation of the underbody catalyst. During such a window, EGO sensors located between or after underbody bricks will predominantly detect oxygen storage behavior of the light-off catalyst. This behavior can be used to determine if the light-off catalyst meets required performance criteria (e.g., switch ratio or index ratio, or various others).

Note that the potential use of such a strategy is not limited to EGO sensors. The strategy can be used with the UEGO sensors that are capable of determining the exhaust air-fuel ratio over a wider range than that of the EGO sensor.

Figure 5:
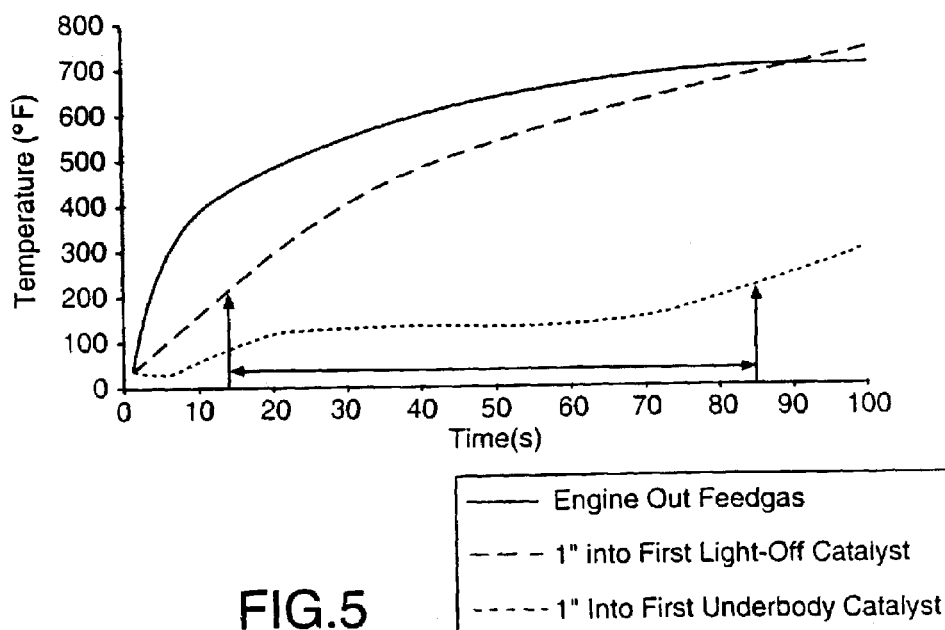

Also note that future advancements in emission control device technology may lead to oxygen storage capabilities at lower catalyst temperatures. As described in the paper by Yun, Son, and Lee, oxygen storage sites can become active at 212 to 482~F. However, as FIG. 5 below illustrates, a robust light off monitoring strategy can still be developed according to an example aspect of the present invention.

As shown in FIG. 5, once again a time window exists whereupon EGO sensors located between or after underbody bricks will predominantly detect the oxygen storage behavior of a light off catalyst. This behavior can be used to determine if the light off catalyst meets required performance.

Also, as described above with regard to FIG. 3 in steps 340 and 342, in one example embodiment of the present invention, the routine performs the catalyst diagnostics when the EGO sensors reach a minimum operating temperature in order to provide reliable measurements.

What is claimed is:

1. A computer-controlled emission diagnostic system for an engine exhaust system of a vehicle, comprising:
   a first emission control device coupled to an exhaust of the engine;
   a second emission control device coupled downstream of said first emission control device;
   a first exhaust gas sensor coupled upstream of said first emission control device;
   a second exhaust gas sensor coupled in or downstream of said second emission control device;
   a computer storage medium having a computer program encoded therein for monitoring the engine exhaust system comprising:
   code for reading a fist signal from said first exhaust gas sensor,
   code for reading a second signal from said second exhaust gas sensor;
   code for indicating an interval in which said first emission control device is operating with an oxygen storage capacity above a preselected percentage based on an estimated catalyst temperature of said first emission control device and said second emission control device is operating with an oxygen storage capacity below a predetermined percentage based on an estimated catalyst temperature of said second emission control device; and
   code for determining performance of said first emission control device based at least on said first and second signals during said indicated interval.

2. The diagnostic system of claim 1 wherein said first emission control device can include multiple catalyst bricks.

3. The diagnostic system of claim 1 wherein said first emission control device is in a close coupled location of the engine exhaust system.

4. The diagnostic system of claim 1 wherein said second emission control device can include multiple catalyst bricks.

5. The diagnostic system of claim 1 wherein said first emission control device is in an underbody location of the engine exhaust system.

6. The diagnostic system of claim 1 wherein said interval is based on a time period.

7. The diagnostic system of claim 1 wherein said interval is based on engine operating conditions independent of a time period.

8. The diagnostic system of claim 1 wherein said interval is based on an estimate of catalyst temperature.

9. The diagnostic system of claim 1 wherein said preselected performance is based on temperature.

10. The diagnostic system of claim 1 wherein said predetermined performance is based on temperature.

11. The diagnostic system of claim 1 wherein said engine operating conditions include at least one of time since engine start, air temperature, and said estimated catalyst temperature.

12. An emission control system for an engine of a vehicle, comprising:
    a first emission control device coupled to an exhaust of the engine;
    a second emission control device coupled downstream of said first emission control device;
    a first exhaust gas sensor coupled upstream of said first emission control device;
    a second exhaust gas sensor coupled in or downstream of said second emission control device;
    a controller for reading a first signal from said first exhaust gas sensor, reading a second signal from said second exhaust gas sensor; determining a period in which said first emission control device is operating above a preselected percentage of oxygen storage capacity based on estimated temperature of said first emission control device, and said second emission control device is operating below a preselected percentage of oxygen storage capacity based on estimated temperature of said second emission control device; and during said period, determining performance of said first emission control device based at least on said first and second signals.

13. The system of claim 12 wherein said first emission control device can include multiple catalyst bricks.

14. The system of claim 13 wherein said first emission control device is in a close coupled location of the engine exhaust system.

15. The system of claim 14 wherein said second emission control device can include multiple catalyst bricks.

16. The system of claim 15 wherein said first emission control device is in an underbody location of the engine exhaust system.

17. An emission control system for an engine of a vehicle, comprising:
    a first emission control device coupled to an exhaust of the engine in a close coupled location;
    a second emission control device coupled downstream of said first emission control device in an underbody location;
    a first exhaust gas sensor coupled upstream of said first emission control device;
    a second exhaust gas sensor coupled in or downstream of said second emission control device;
    a controller for reading a first signal from said first exhaust gas sensor, reading a second signal from said second exhaust gas sensor; determining an interval in which said first emission control device is operating above a preselected percentage of oxygen storage capacity based on estimated temperature of said first emission control device and said second emission control device is operating below a preselected percentage of oxygen storage capacity based on estimated temperature of said second emission control device; and during said interval, determining performance of said first emission control device based at least on said first and second signals.

* * * * *